US011952310B2

United States Patent
Cai et al.

(10) Patent No.: US 11,952,310 B2
(45) Date of Patent: Apr. 9, 2024

(54) SILICATE GLASS COMPOSITIONS USEFUL FOR THE EFFICIENT PRODUCTION OF THROUGH GLASS VIAS

(71) Applicant: CORNING INCORPORATED, Corning, NY (US)

(72) Inventors: Ling Cai, Painted Post, NY (US); Tian Huang, Painted Post, NY (US); Yuhui Jin, Painted Post, NY (US); Jingshi Wu, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 775 days.

(21) Appl. No.: 16/863,396

(22) Filed: Apr. 30, 2020

(65) Prior Publication Data
US 2020/0354267 A1  Nov. 12, 2020

Related U.S. Application Data

(60) Provisional application No. 62/846,059, filed on May 10, 2019.

(51) Int. Cl.
*C03C 23/00* (2006.01)
*C03C 3/091* (2006.01)
(Continued)

(52) U.S. Cl.
CPC .......... *C03C 23/0025* (2013.01); *C03C 3/091* (2013.01); *C03C 3/097* (2013.01);
(Continued)

(58) Field of Classification Search
None
See application file for complete search history.

(56) References Cited

U.S. PATENT DOCUMENTS 9,278,886 B2  3/2016  Boek et al.
9,321,680 B2  4/2016  Chuang et al.
(Continued)

FOREIGN PATENT DOCUMENTS

CN  105246850 A  1/2016
CN  105451988 A  3/2016
(Continued)

OTHER PUBLICATIONS

Bhuyan et al; "High Aspect Ratio Nanochannel Machining Using Single Shot Femtosecond Bessel Beams", Appl. Phys. Lett. 97, 081102 (2010.
(Continued)

*Primary Examiner* — David Sample
(74) *Attorney, Agent, or Firm* — Kevin L. Bray

(57) ABSTRACT

Disclosed herein are glass compositions that present several advantages over glasses and other materials currently used for redistribution layers for RF, interposers, and similar applications. The glasses disclosed herein are low cost, flat glasses that have high throughput for the laser damage and etching process used to create through glass vias (TGV). TGV generated using the silicate glasses and processes described herein have large waist diameters ($D_w$), which is a desirable feature with respect to producing glass articles such as interposers.

19 Claims, 6 Drawing Sheets

(51) Int. Cl.
*C03C 3/097* (2006.01)
*C03C 15/00* (2006.01)

(52) U.S. Cl.
CPC ............ *C03C 15/00* (2013.01); *C03C 23/001* (2013.01); *C03C 23/0015* (2013.01)

(56) References Cited

U.S. PATENT DOCUMENTS

| | | | |
|---|---|---|---|
| 10,144,093 | B2 | 12/2018 | Marjanovic et al. |
| 2009/0013724 | A1* | 1/2009 | Koyo ................. B23K 26/0093 65/31 |
| 2014/0147624 | A1 | 5/2014 | Streltsov et al. |
| 2016/0368100 | A1 | 12/2016 | Marjanovic et al. |
| 2017/0103249 | A1* | 4/2017 | Jin ........................... H05K 3/22 |
| 2018/0022634 | A1 | 1/2018 | Inoue et al. |
| 2018/0029924 | A1* | 2/2018 | Inoue ................... B23K 26/352 |
| 2018/0340262 | A1 | 11/2018 | Hiranuma |
| 2019/0126594 | A1 | 5/2019 | Boek et al. |

FOREIGN PATENT DOCUMENTS

| | | |
|---|---|---|
| CN | 106029286 A | 10/2016 |
| CN | 107108334 A | 8/2017 |
| JP | 2008156200 A | 7/2008 |
| WO | 2012/075072 A2 | 6/2012 |

OTHER PUBLICATIONS

Borghi et al; "M2 Factor of Bessel-Gauss Beams", Opt. Lett. 22, 262 (1997.

International Search Report and Written Opinion of the International Searching Authority; PCT/US2020/030901; dated Sep. 10, 2020; 9 Pages; European Patent Office.

Marcinkevicius et al; "Application of Femtosecond Bessel-Gauss Beam in Microstructuring of Transparent Materials"; Optical Pulse and Beam Propagation III, Y.B. Band, Ed., Proc. SPIE vol. 4271, 150-158 (2001).

Chinese Patent Application No. 202080034736.4, Office Action dated Feb. 7, 2023, 5 pages (English Translation only), Chinese Patent Office.

* cited by examiner

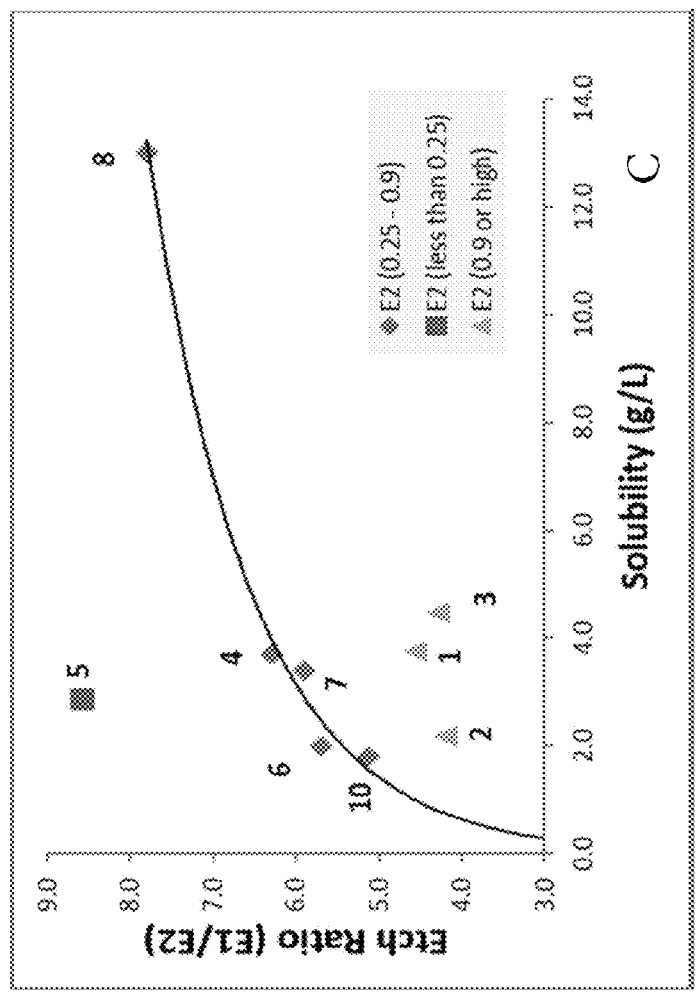
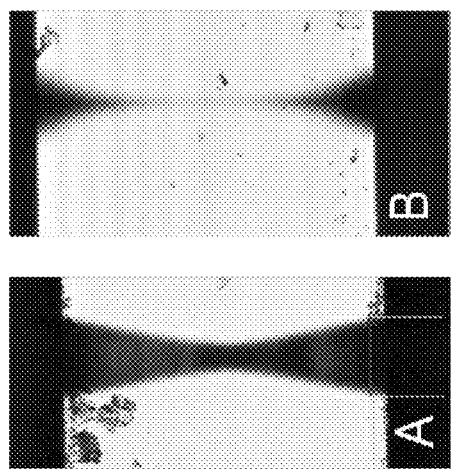
FIG. 3A-3C

SILICATE GLASS COMPOSITIONS USEFUL FOR THE EFFICIENT PRODUCTION OF THROUGH GLASS VIAS

This application claims the benefit of priority to U.S. Provisional Application Ser. No. 62/846,059 filed on May 10, 2019, the content of which is relied upon and incorporated herein by reference in its entirety.

BACKGROUND

Today there is intense interest in thin glass with precision-formed holes for electronics applications. The holes are filled with a conducting material and are used to conduct electrical signals from one part to another to provide precise connection of central processing units, memory chips, graphical processing units, or other electronic components. For such applications, substrates with metalized holes in them are typically called "interposers." As compared to presently used interposer materials, such as fiber-reinforced polymer or silicon, glass has a number of advantageous properties. Glass can be formed thin and smooth in large sheets without the need for polishing, it has higher stiffness and greater dimensional stability than organic alternatives, it is a much better electrical insulator than silicon, it has better dimensional (thermal and rigidity) stability than organic options, and it can be tailored to different coefficients of thermal expansion to control stack warp in integrated circuits. Electrical loss with glass elements is low, since glass is an insulator, while resistivity is high.

While the diameters of the holes (also referred to, when the etching process is completed, as "through glass vias" or TGVs) at the surface of the glass are wide, the diameters at the center of the glass or narrowest part (the "waist") are often much lower. Improved TGV metallization and, hence, improved electrical performance would result from TGVs with wider waist diameters. In particular, a wider waist diameter may help reduce the dissipation of electromagnetic energy as heat (e.g., dielectric loss, Joule heating); this can be achieved when the interposer material has a low loss angle or loss tangent.

What is needed are new glass compositions that allow high-throughput glass manufacturing and enable the making of through glass vias with high waist diameters. Ideally, the glass compositions would also have desirable electrical properties for use with stacked integrated circuits and other electronic technologies. The subject matter of the present disclosure addresses these needs.

SUMMARY

Disclosed herein are glass compositions that present several advantages over glasses and other materials currently used for redistribution layers for RF, interposers, and similar applications. The glasses disclosed herein are low cost, flat glasses that have high throughput for the laser damage and etching process used to create through glass vias (TGVs). TGVs generated using the silicate glasses and processes described herein have large waist diameters, which is a desirable feature with respect to producing glass articles such as interposers.

In a first aspect, a silicate glass article comprises one or more of through glass vias, wherein
  (a) the through glass via has a first surface diameter ($D_{S1}$), a second surface diameter ($D_{S2}$), and a waist diameter ($D_w$), wherein the ratio of $D_{S1}/D_w$ is from 1:1 to 2:1 and the ratio of $D_{S2}/D_w$ is from 1:1 to 2:1, and
  (b) the silicate glass comprises (1) $B_2O_3$ in the amount of at least 5 mol % or (2) $Al_2O_3$ in the amount of less than 10 mol % and RO in a total amount of less than 10 mol %, wherein R is Mg, Ca, Ba, Sr, or any combination thereof.

In a second aspect, the silicate glass article of the first aspect has $B_2O_3$ in the amount of at least 10 mol %.

In a third aspect, the silicate glass article of the first aspect has $B_2O_3$ in the amount of 5 mol % to 30 mol %.

In a fourth aspect, the silicate glass article of the first aspect has $B_2O_3$ in the amount of 5 mol % to 20 mol %.

In a fifth aspect, the silicate glass article of the first aspect has $Al_2O_3$ in the amount of less than 7.5 mol %.

In a sixth, the silicate glass article of the first aspect has $Al_2O_3$ in the amount of less than 5 mol %.

In a seventh aspect, the silicate glass article of the first aspect has $Al_2O_3$ in the amount of from 1 mol % to 5 mol %.

In an eighth aspect, the silicate glass article of the first aspect has RO in the amount of less than 7.5 mol %.

In a ninth aspect, the silicate glass article of the first aspect has RO in the amount of less than 5 mol %.

In a tenth aspect, the silicate glass article of the first aspect has RO in the amount of from 1 mol % to 5 mol %.

In an eleventh aspect, the silicate glass article of the first aspect has $Al_2O_3$ in the amount of from 1 mol % to 5 mol % and RO in the amount of from 1 mol % to 5 mol %.

In a twelfth aspect, the silicate glass comprises $B_2O_3$ in the amount of at least 5 mol %, $SiO_2$ in the amount of 50 mol % to 75 mol %, $Al_2O_3$ in the amount of 4 mol % to 20 mol %, MgO in the amount of 0 mol % to 20 mol %, CaO in the amount of 0 mol % to 20 mol %, SrO in the amount of 0 mol % to 15 mol %, BaO in the amount of 0 mol % to 15 mol %, and $P_2O_5$ in the amount of 0 mol % to 10 mol %.

In a thirteenth aspect, the silicate glass article of the first aspect further comprises $P_2O_5$ and the silicate glass comprises $Al_2O_3$ in the amount of less than 10 mol %, $SiO_2$ in the amount of 50 mol % to 75 mol %, MgO in the amount of 0 mol % to 10 mol %, CaO in the amount of 0 mol % to 10 mol %, SrO in the amount of 0 mol % to 10 mol %, BaO in the amount of 0 mol % to 10 mol %, and $P_2O_5$ in the amount of 0 mol % to 10 mol %, wherein the sum of RO is in the amount of less than 10 mol %.

In a fourteenth aspect, the silicate glass article of the first aspect has a surface diameter from 10 μm to 100 μm.

In a fifteenth aspect, the silicate glass article of the first aspect has a waist diameter from 5 μm to 90 μm.

In a sixteenth aspect, the silicate glass article of the first aspect has a thickness from 50 μm to 500 μm.

In a seventeenth aspect, a method for producing a through glass via in a silicate glass article, the method comprises:
  (1) irradiating the silicate glass article with a non-diffracting laser beam to form a laser beam focal line, induced absorption occurring within the laser beam focal line to produce a damage track, wherein the glass article comprises (1) $B_2O_3$ in the amount of at least 5 mol % or (2) $Al_2O_3$ in the amount of less than 10 mol % and RO in the amount of less than 10 mol %, wherein R is Mg, Ca, Ba, Sr, or any combination thereof, and
  (2) etching the silicate glass article with an etching solution to produce the through glass via, the etching solution comprising an acid.

In an eighteenth aspect, the laser beam of the seventeenth aspect is formed with a picosecond laser.

In a nineteenth aspect, the laser beam of the seventeenth aspect has a wavelength of greater than 500 nm.

In a twentieth aspect, the laser beam of the seventeenth aspect has a wavelength greater than 535 nm.

In a twenty-first aspect, the laser beam of the seventeenth aspect has a wavelength greater than 500 nm to 1,100 nm and a power from 40 µJ to 120 µJ.

In a twenty-second aspect, the laser beam of the seventeenth aspect is a laser burst.

In a twenty-third aspect, the etching solution of the seventeenth aspect comprises hydrofluoric acid In a twenty-fourth aspect, the hydrofluoric acid of the twenty-third aspect is aqueous hydrofluoric acid with a hydrofluoric acid concentration of from 1 wt % to 50 wt %.

In a twenty-fifth aspect, the etching solution of the twenty-third aspect comprises hydrofluoric acid in combination with hydrochloric acid, sulfuric acid, nitric acid, acetic acid, or any combination thereof.

In a twenty-sixth aspect, the silicate glass article of the seventeenth aspect is etched at a temperature of from 0° C. to 50° C.

In a twenty-seventh aspect, the non-diffracting laser beam of the seventeenth aspect is a Bessel beam or a Gauss-Bessel beam.

In a twenty-eighth aspect, the irradiating of the twenty-seventh aspect includes forming a laser beam focal line with the Bessel beam or Gauss-Bessel beam in the silicate glass article.

In a twenty-ninth aspect, the etching of the seventeenth aspect produces an etched byproduct, wherein the etched byproduct has an etched byproduct solubility greater than or equal to 0.5 g/L in the etching solution.

In a thirtieth aspect, the glass solubility of the twenty-ninth aspect is determined using an etching solution comprising 1.45 M HF and 0.8 M $HNO_3$ at 20° C.

In a thirty-first aspect, the method of any one of the seventeenth through thirtieth aspects, wherein the etch rate of the damage track ($E_1$) is greater than the etch rate of the silicate glass article not damaged by the laser ($E_2$).

In a thirty-second aspect, the ratio of $E_1/E_2$ of the thirty-first aspect is from 1 to 50.

In a thirty-third aspect, the acid is hydrofluoric acid and the etch rate $E_2$ of the thirty-first aspect is from 0.25 µm/min to 0.9 µm/min.

In a thirty-fourth aspect, a glass article is produced by the method in any one of the seventeenth through thirty-third aspects.

In a thirty-fifth aspect, a silicate glass comprises (1) $B_2O_3$ in the amount of at least 5 mol % or (2) $Al_2O_3$ in the amount of less than 10 mol % and RO in a total amount of less than 10 mol %, wherein R is Mg, Ca, Ba, Sr, or any combination thereof.

In a thirty-sixth aspect, the silicate glass of the thirty-fifth aspect comprises $B_2O_3$ in the amount of at least 5 mol %, $SiO_2$ in the amount of 50 mol % to 75 mol %, $Al_2O_3$ in the amount of 4 mol % to 20 mol %, MgO in the amount of 0 mol % to 20 mol %, CaO in the amount of 0 mol % to 20 mol %, SrO in the amount of 0 mol % to 15 mol %, BaO in the amount of 0 mol % to 15 mol %, and $P_2O_5$ in the amount of 0 mol % to 10 mol %.

In a thirty-seventh aspect, the silicate glass of the thirty-fifth aspect further comprises $P_2O_5$, wherein the silicate glass comprises $Al_2O_3$ in the amount of less than 10 mol %, $SiO_2$ in the amount of 50 mol % to 75 mol %, MgO in the amount of 0 mol % to 10 mol %, CaO in the amount of 0 mol % to 10 mol %, SrO in the amount of 0 mol % to 10 mol %, BaO in the amount of 0 mol % to 10 mol %, and $P_2O_5$ in the amount of 0 mol % to 10 mol %, wherein the sum of RO is in the amount of less than 10 mol %.

The advantages of the materials, methods, and devices described herein will be set forth in part in the description that follows, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE DRAWINGS

The accompanying drawings, which are incorporated in and constitute a part of this specification, illustrate several aspects described below:

FIGS. 3A-3C shows that glass byproduct solubility in an etchant influences the etch ratio ($E_1/E_2$) for etching through glass vias.

DETAILED DESCRIPTION

Figure 1:
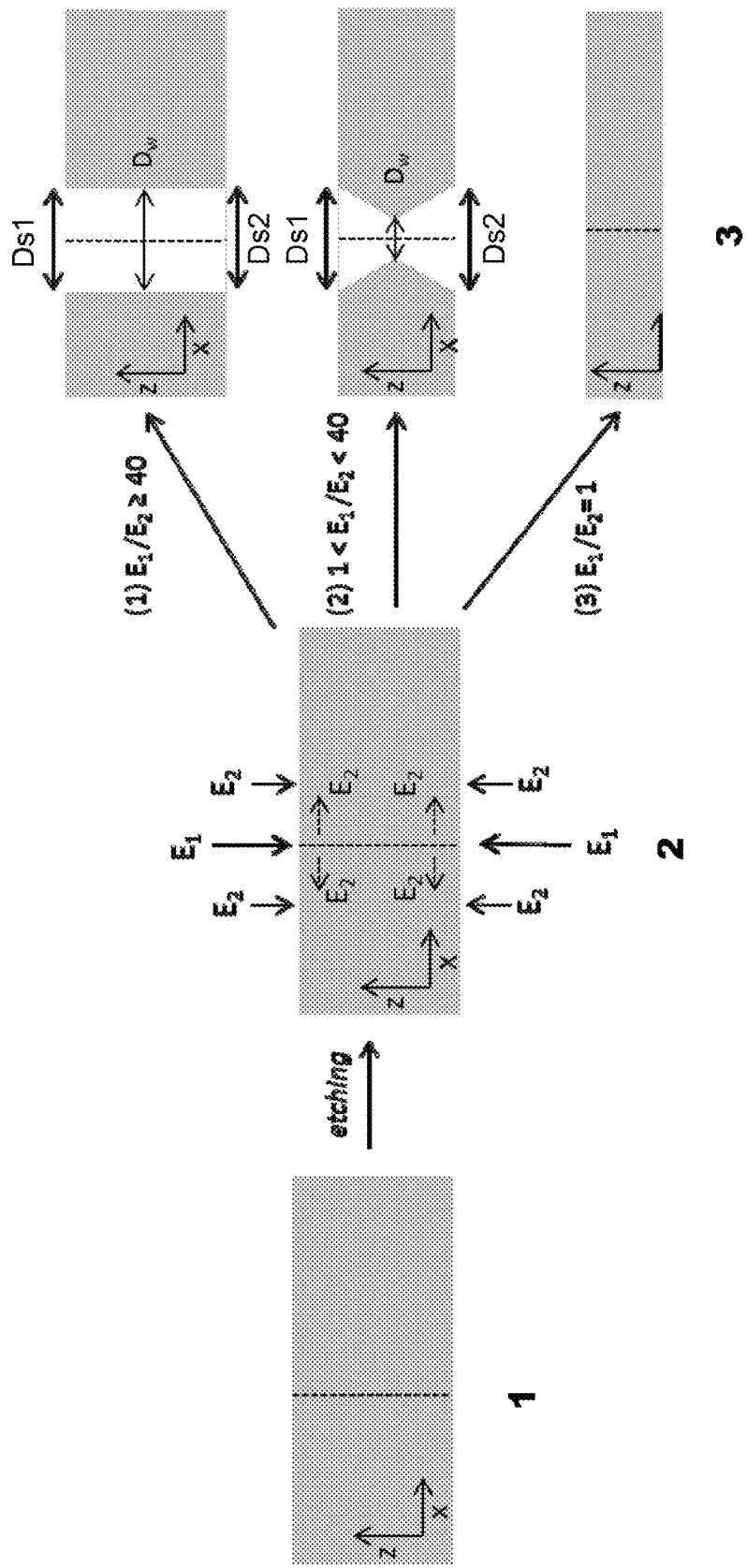
FIG. 1 shows a schematic of the process of making through glass vias using the laser damage and etch strategy.
Figures 2A, 2B, 2C, 2D, 2E:
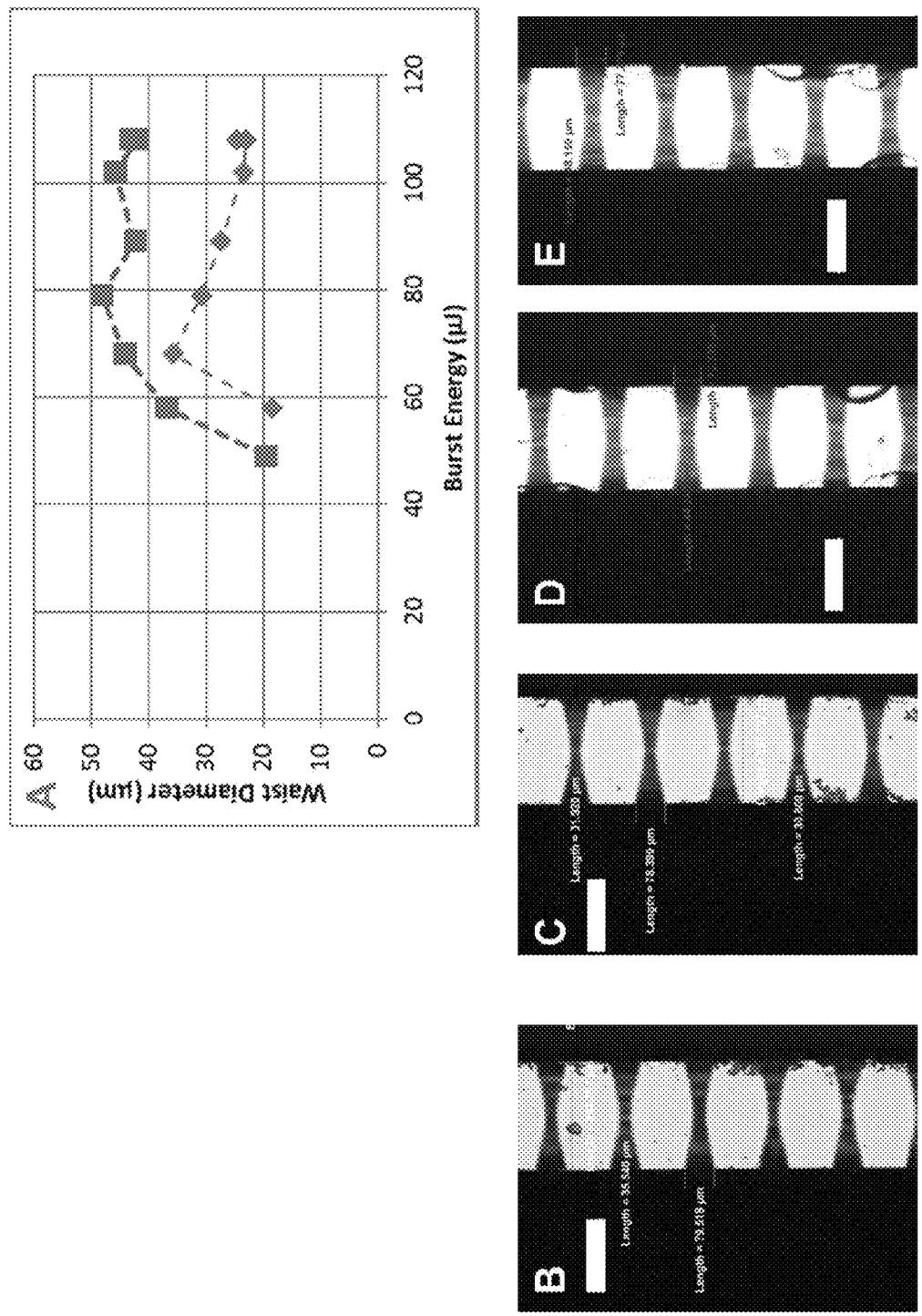
FIGS. 2A-2E shows a comparison of waist diameter of two glass compositions produced by the methods described herein.

Before the present materials, articles and/or methods are disclosed and described, it is to be understood that the aspects described below are not limited to specific compounds, synthetic methods, or uses, as such may, of course, vary. It is also to be understood that the terminology used herein is for the purpose of describing particular aspects only and is not intended to be limiting.

In the specification and in the claims that follow, reference will be made to a number of terms that shall be defined to have the following meanings:

It must be noted that, as used in the specification and the appended claims, the singular forms "a," "an," and "the" include plural referents unless the context clearly dictates otherwise. Thus, for example, reference to "an alkaline earth metal oxide" in a glass composition includes mixtures of two or more alkaline earth metal oxides and the like.

"Optional" or "optionally" means that the subsequently described event or circumstance can or cannot occur, and that the description includes instances where the event or circumstance occurs and instances where it does not. For example, the glass compositions described herein may optionally contain an alkaline earth metal oxide, where the alkaline earth metal oxide may or may not be present.

As used herein, the term "about" is used to provide flexibility to a numerical range endpoint by providing that a given numerical value may be "a little above" or "a little below" the endpoint without affecting the desired result. For purposes of the present disclosure, "about" refers to a range extending from 10% below the numerical value to 10% above the numerical value. For example, if the numerical value is 10, "about 10" means between 9 and 11 inclusive of the endpoints 9 and 11.

Throughout this specification, unless the context dictates otherwise, the word "comprise," or variations such as "comprises" or "comprising," will be understood to imply the inclusion of a stated element, integer, step, or group of elements, integers, or steps, but not the exclusion of any other element, integer, step, or group of elements, integers, or steps.

As used herein, "through glass vias" (TGVs) are microscopic holes through a glass article. In one aspect, TGVs are filled or metalized with a conductive material such as copper. TGV refers to a single through glass via.

A TGV has a surface opening and extends all the way through a glass article. "Surface diameter" as used herein refers to the diameter (usually measured in μm) of the TGV at either surface of the glass, which are referred to herein as the first surface diameter ($D_{S1}$) and the second surface diameter ($D_{S2}$). A TGV also has a "waist." "Waist diameter" as used herein refers to the diameter (also typically in μm) of the TGV at the waist, which is the narrowest point of the TGV and is located in the interior of the glass between the first surface and the second surface. Unless otherwise specified, the length of a TGV refers to a linear dimension of the TGV in the thickness direction of the glass article and the diameter of a TGV refers to a linear dimension of the TGV in a direction transverse to the thickness dimension of the glass article. The term "diameter" will be used in reference to a TGV even if the cross-sectional shape of the TGV deviates from purely circular. In such instances, diameter refers to the longest linear dimension of the cross-sectional shape of the TGV (e.g. the major axis if the TGV has an elliptical cross-sectional shape). As used herein, the thickness direction of a glass article is the smallest of the length, height, and width dimensions of the glass article. When the TGV is formed by a process that includes forming damage tracks with a laser (see below), the thickness direction of the glass article corresponds to the direction of propagation of the laser beam.

The term "RO" refers to alkaline earth metal oxides individually or collectively and includes any, or any combination of two or more, of MgO, CaO, SrO, and BaO. The "amount" of RO present in a composition refers to the total of the mol % of MgO, CaO, SrO, and BaO present in the composition.

References in the specification and claims to atomic percentages of a particular element in a composition or article denote the molar relationship between the element or component and any other elements or components in the composition or article for which an atomic percentage is expressed. Thus, in a composition containing 2 atomic percent of component X and 5 atomic percent of component Y, X and Y are present at a molar ratio of 2:5, and are present in such a ratio regardless of whether additional components are used in the composition.

As used herein, a plurality of items, structural elements, compositional elements, and/or materials may be presented in a common list for convenience. However, these lists should be construed as though each member of the list is individually identified as a separate and unique member. Thus, no individual member of any such list should be construed as a de facto equivalent of any other member of the same list based solely on its presentation in a common group, without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range was explicitly recited. As an example, a numerical range of "about 1" to "about 5" should be interpreted to include not only the explicitly recited values of about 1 to about 5, but also to include individual values and sub-ranges within the indicated range. Thus, included in this numerical range are individual values such as 2, 3, and 4, the sub-ranges such as from 1-3, from 2-4, from 3-5, from about 1-about 3, from 1 to about 3, from about 1 to 3, etc., as well as 1, 2, 3, 4, and 5, individually. The same principle applies to ranges reciting only one numerical value as a minimum or maximum. Furthermore, such an interpretation should apply regardless of the breadth or range of the characters being described.

Disclosed are materials and components that can be used for, can be used in conjunction with, can be used in preparation for, or are products of the disclosed compositions and methods. These and other materials are disclosed herein, and it is understood that when combinations, subsets, interactions, groups, etc. of these materials are disclosed, that while specific reference to each various individual combination and permutation of these compounds may not be explicitly disclosed, each is specifically contemplated and described herein. For example, if an alkali metal oxide additive is disclosed and discussed, and a number of different alkaline earth metal oxide additives are discussed, each and every combination of alkali metal oxide additive and alkaline earth metal oxide additive that is possible is specifically contemplated unless specifically indicated to the contrary. For example, if a class of alkali metal oxides A, B, and C are disclosed, as well as a class of alkaline earth metal oxide additives D, E, and F, and an example combination of A+D is disclosed, then even if each is not individually recited, each is individually and collectively contemplated. Thus, in this example, each of the combinations A+E, A+F, B+D, B+E, B+F, C+D, C+E, and C+F is specifically contemplated and should be considered from disclosure of A, B, ad C; D, E, and F; and the example combination A+D. Likewise, any subset or combination of these is also specifically contemplated and disclosed. Thus, for example, the sub-group of A+E, B+F, and C+E is specifically contemplated and should be considered from disclosure of A, B, and C; D, E, and F; and the example combination of A+D. This concept applies to all aspects of the disclosure including, but not limited to, steps in methods of making and using the disclosed compositions. Thus, if there are a variety of additional steps that can be performed with any specific embodiment or combination of embodiments of the disclosed methods, each such composition is specifically contemplated and should be considered disclosed.

I. Glass Compositions

Disclosed herein are silicate glass compositions that can be processed by a laser damage and etch process described herein in order to create glass articles with one, several, or a plurality of TGVs. The glass compositions are formulated such that the TGVs formed have a waist diameter that approaches each surface diameter of the glass. Not wishing to be bound by theory, by selecting particular components and amounts to produce the glass composition, the solubility of the byproducts formed during the etching process can be increased. This in turn reduces the probability that the byproduct will accumulate as insoluble solids in the TGV. Accumulation of byproducts in the TGV is undesirable because it results in decreased waist diameter. By designing the glass composition to produce byproducts during etching with increased solubility, less accumulation of insoluble solids occurs in the TGV and larger waist diameters result. This is discussed in greater detail below.

The glasses disclosed herein are silicate glasses. As used herein, a silicate glass is a glass that includes $SiO_2$ in an amount of 50 mol % or greater. In one aspect, the glass composition includes $SiO_2$ in an amount of from about 50 mol % to about 75 mol %. In another aspect, the $SiO_2$ is present at about 50, 55, 60, 65, 70, or 75 mol %, where any value can be a lower and upper endpoint (e.g., 55 to 70 mol %).

In one aspect, the glass compositions disclosed herein include $B_2O_3$. In another aspect, the glass composition includes $B_2O_3$ in an amount of at least 5 mol %, or at least 10 mol %. In another aspect, the glass composition includes $B_2O_3$ in an amount of from about 5 mol % to about 30 mol %. In a further aspect, $B_2O_3$ is present at about 5, 10, 15, 20, 25, or about 30 mol %, where any value can be a lower and upper endpoint (e.g., 5 to 20 mol %).

In another aspect, the glass can include low amounts of $Al_2O_3$. In one aspect, the glass composition includes $Al_2O_3$ in an amount of less than 10 mol %, less than 7.5 mol %, or less than 5 mol %. In another aspect, the glass composition includes $Al_2O_3$ in an amount of from about 5 mol % to about 30 mol %, or an amount from about 10 mol % to about 20 mol %. In another aspect, the amount of $Al_2O_3$ in the silicate glass is at least 1 mol %, or at least 5 mol %, or at least 10 mol %. In a further aspect, $Al_2O_3$ is present at about 0, 1, 2, 3, 4, 5, 6, 7, 8, 9, or about 10 mol %, where any value can be a lower and upper endpoint (e.g., 1 to 5 mol %). In another aspect, the glass does not include $Al_2O_3$.

In another aspect, the glass composition includes one or more alkaline earth metal oxides (RO), where the amount of RO (MgO, BaO, CaO, and SrO combined) is less than or equal to about 10 mol %, less than or equal to about 7.5 mol %, or less than or equal to about 5 mol %. In another aspect, the alkaline earth metal oxide (RO) is present at about 0, 1, 2, 3, 4, 5, 6, 7, 8, 9, or 10 mol %, where any value can be a lower and upper endpoint (e.g., 1 to 5 mol %).

In one aspect, the glass composition includes from 0 to 10 mol % of MgO, or about 0, 1, 2, 3, 4, 5, 6, 7, 8, 9, or 10 mol % MgO, where any value can be a lower and upper endpoint (e.g., 1 to 5 mol %). In another aspect, the glass composition includes from 0 to 10 mol % of CaO, or about 0, 1, 2, 3, 4, 5, 6, 7, 8, 9, or 10 mol % CaO, where any value can be a lower and upper endpoint (e.g., 1 to 5 mol %). In still another aspect, the glass composition includes from 0 to 10 mol % of SrO, or about 0, 1, 2, 3, 4, 5, 6, 7, 8, 9, or 10 mol % SrO, where any value can be a lower and upper endpoint (e.g., 1 to 5 mol %). In another aspect, the glass composition includes from 0 to 10 mol % BaO, or about 0, 1, 2, 3, 4, 5, 6, 7, 8, 9, or 10 mol % BaO, where any value can be a lower and upper endpoint (e.g., 1 to 5 mol %).

In another aspect, the glass composition includes MgO, CaO, BaO, SrO, or any combination thereof, wherein the sum of MgO, CaO, BaO, and SrO is from 0 to 10 mol %, or about 0, 1, 2, 3, 4, 5, 6, 7, 8, 9, or 10 mol %, where any value can be a lower and upper endpoint (e.g., 1 to 5 mol %).

In another aspect, the glass composition includes low amounts of $Al_2O_3$ and RO. In one aspect, the glass composition includes (1) $Al_2O_3$ in an amount of less than 10 mol %, less than 7.5 mol %, or less than 5 mol % and (2) RO in an amount of less than 10 mol %, less than 7.5 mol %, or less than 5 mol %. In another aspect, the glass includes no $Al_2O_3$, and RO in an amount of 0, 1, 2, 3, 4, 5, 6, 7, 8, 9, or 10 mol %, where any value can be a lower and upper endpoint (e.g., 5 to 10 mol %).

In yet another aspect, the glass composition contains from 0 to 10 mol % $P_2O_5$, or 0, 1, 2, 3, 4, 5, 6, 7, 8, 9, or 10 mol % $P_2O_5$, where any value can be a lower and upper endpoint (e.g., 1 to 5 mol %).

In another aspect, the glass composition includes $B_2O_3$ in an amount of at least 5 mol %, $SiO_2$ in an amount of 50 mol % to 75 mol %, $Al_2O_3$ in an amount of 4 mol % to 20 mol %, MgO in an amount of 0 mol % to 20 mol %, CaO in an amount of 0 mol % to 20 mol %, SrO in an amount of 0 mol % to 15 mol %, BaO in an amount of 0 mol % to 15 mol %, and $P_2O_5$ in an amount of 0 mol % to 10 mol %.

In another aspect, the glass composition includes $Al_2O_3$ in an amount of less than 10 mol %, $SiO_2$ in an amount of 50 mol % to 75 mol %, MgO in an amount of 0 mol % to 10 mol %, CaO in an amount of 0 mol % to 10 mol %, SrO in an amount of 0 mol % to 10 mol %, BaO in an amount of 0 mol % to 10 mol %, and $P_2O_5$ in an amount of 0 mol % to 10 mol %, wherein the amount of RO is less than 10 mol %.

In one aspect, the glass compositions can be manufactured into glass sheets and/or other glass articles using a high-throughput process. In a further aspect, the glass compositions can be processed by a fusion draw process, a float process, or a rolling process.

The "fusion draw" process is a method of forming high performance flat glass. In the fusion draw process, raw materials are introduced into a melting tank at a temperature greater than 1,000° C. The molten glass is thoroughly mixed and then released, with uniform flow, into midair, where it feeds into drawing equipment while lengthening and beginning to cool. In one aspect, glasses formed by this process do not require surface polishing. In another aspect, glasses formed by this process have uniform thickness and are able to withstand high amounts of heat. In one aspect, the glasses disclosed herein can be formed into sheets using the fusion draw process.

The "float" method of forming glass is an alternative method for forming flat glass. After raw materials are melted and mixed, the molten glass flows onto a bath of hot tin. Float formed glass likely requires surface polishing and/or other post-production processing. In one aspect, the glasses disclosed herein can be formed into sheets using the float method.

As used herein, the "rolling" process for forming glass is similar to a drawing process, but conducted horizontally on rollers. Glass sheets made using the rolling process require grinding and polishing. In one aspect, the glasses disclosed herein can be formed into sheets using the rolling process.

II. Process for Producing Through Glass Vias

The process for producing through glass vias in a silicate glass article involves (1) irradiating the silicate glass article with a laser beam to produce a damage track and (2) etching the glass article with an acid to produce the through glass via. Each step is described in detail below.

a. Formation of Damage Track

The first step of the process described herein involves producing one or more damage tracks in the silicate glass article. As used herein, a "damage track" is an area of glass that has been structurally modified by irradiation with a laser. The damage track is depicted in FIG. 1 as a dashed line through the laser damaged glass 1. In some aspects, a damage track has a lower refractive index than the surrounding undamaged glass. In one aspect, the lower refractive index may be due to volume expansion of the glass in the laser-irradiated area. In a further aspect, glass in the damage track has a lower density than the surrounding undamaged glass. In one aspect, the damage track is a pit on the surface of the glass. In another aspect, the damage track is cylindrical or columnar in shape and extends partially or fully through the glass. In some aspects, the damage track includes bubbles, voids, or gaps. A damage track may also be referred to as a "pilot hole."

The damage track can be produced using several different techniques. In one aspect, a pulsed laser beam is focused to a laser beam focal line oriented along the beam propagation direction and directed into the glass article, where the laser beam focal line generates an induced absorption within the glass. The induced absorption produces a damage track along the laser beam focal line within the glass. As used herein, "induced absorption" means multiphoton absorption or non-linear absorption of the laser beam. In another aspect, the glass article is transparent to the wavelength of the laser beam. As used herein, transparent means linear absorption of less than 10%/mm of thickness of the laser wavelength by the glass article. As used herein, a laser beam focal line corresponds to an approximately cylindrical region of illumination in the glass article with a central axis that extends in the direction of the damage track and a length greater than 0.1 mm. The intensity of laser light is approximately uniform throughout the laser beam focal line and is sufficiently high throughout the laser beam focal line to generate induced absorption.

In another aspect, by taking advantage of a specialized optical delivery system and a picosecond pulsed laser, damage tracks can be formed in the glass article with as little as a single laser pulse (or single burst of pulses) being required to form each damage track. In a further aspect, this process permits damage track formation rates that are 100× or more faster than what might be achieved with an ablative nanosecond laser process.

In one aspect, the laser beam focal line can be created by using a Bessel beam, a Gauss-Bessel beam, or other non-diffracting beam. As used herein, a non-diffracting laser beam is a laser beam having a Rayleigh range that is a factor of two or greater than the Rayleigh range of a Gaussian beam with the same pulse duration at the same wavelength. Further information on Bessel beams, Gauss-Bessel beams, beam divergence and Rayleigh range can be found in the articles: "High Aspect Ratio Nanochannel Machining Using Single Shot Femtosecond Bessel Beams", M. K. Bhuyan, et al., Appl. Phys. Lett. 97, 081102 (2010); "$M^2$ Factor of Bessel-Gauss Beams", R. Borghi and M. Santasiero, Opt. Lett. 22, 262 (1997); and "Application of Femtosecond Bessel-Gauss Beam in Microstructuring of Transparent Materials", A. Marcinkevicius et al., in Optical Pulse and Beam Propagation III, Y. B. Band, ed., Proc. SPIE Vol. 4271, 150-158 (2001).

Further in one aspect, the laser beam focal line can be generated using an axicon or optic with a spherical aberration. In some aspects, the laser beam focal line can have a length in a range of between about 0.1 mm and about 10 mm, such as about 1 mm, about 2 mm, about 3 mm, about 4 mm, about 5 mm, about 6 mm, about 7 mm, about 8 mm, or about 9 mm, or a length in a range of between about 0.1 mm and about 1 mm, and an average diameter in a range of between about 0.1 µm and about 5 µm.

In some aspects, the pulse duration can be in a range of between greater than about 1 ps and less than about 100 ps, such as greater than about 5 ps and less than about 20 ps, and the repetition rate can be in a range of between about 1 kHz and 4 MHz, such as in a range of between about 10 kHz and 650 kHz.

In addition to a single pulse at the aforementioned repetition rates, in one aspect, the pulses can be produced in bursts of two pulses or more (such as 3 pulses, 4, pulses, 5 pulses or more) separated by a duration in a range of between about 1 ns and about 50 ns, for example, 10 ns to 30 ns, such as about 20 ns±2 ns, at an energy of at least 40 µJ per burst, and the burst repetition frequency can be in a range of between about 1 kHz and about 200 kHz. In another aspect, the energy of an individual pulse within the burst can be less, and the exact individual laser pulse energy will depend on the number of pulses within the burst and the rate of decay (e.g. exponential decay rate) of the laser pulses with time. For example, for a constant energy/burst, if a burst contains 10 individual laser pulses, then each individual laser pulse will contain less energy than if the same burst had only 2 individual laser pulses.

In one aspect, the damage track is formed in the glass when a single burst of pulses strikes substantially the same location on the glass article. That is, multiple laser pulses within a single burst correspond to a single damage track in the glass. Further in this aspect, since the glass is translated (for example by a constantly moving stage) or the beam is moved relative to the glass, the individual pulses within the burst cannot be at exactly the same spatial location on the glass. However, the pulses are well within 1 µm of one another so that they strike the glass at essentially the same location. For example, the pulses may strike the glass at a spacing (sp) where $0<sp\leq500$ nm from one another. For example, when a location on the glass is hit with a burst of 20 pulses the individual pulses within the burst strike the glass within 250 nm of each other. Thus, in some aspects, the spacing sp is in a range from about 1 nm to about 250 nm or from about 1 nm to about 100 nm.

The damage tracks created by the laser generally take the form of structurally modified regions (possibly containing debris resulting from damage of the glass within the laser beam focal line) with interior dimensions (e.g. longest dimension (such as a diameter) in a direction transverse to the direction of laser beam propagation) in the range of about 0.1 µm to 2 µm, for example 0.1-1.5 µm. In a further aspect, the damage tracks formed by the laser are small (single µm or less) in dimension. In some embodiments, the damage tracks are 0.2 µm to 0.7 µm in diameter. In some aspects, the damage tracks are not continuous holes or channels. Further in these aspects, the diameter of the damage tracks can be 5 µm or less, 4 µm or less, 3 µm or less, 2 µm or less, or 1 µm or less, where diameter refers to a linear dimension in a direction transverse to the direction of laser beam propagation. In some aspects, the diameter of the damage tracks can be in a range from greater than 100 nm to less than 2 µm, or from greater than 100 nm to less than 0.5 µm. In a further aspect, at this stage, these damage tracks are un-etched (i.e., they have not yet been widened by the etching).

In one aspect, the damage tracks can perforate the entire thickness of the glass article, and may or may not form a continuous opening or channel throughout the depth of the glass. In an alternative aspect, the damage tracks do not extend through the entire thickness of the glass. In either of these aspects, there are often regions of glass debris that plug or occupy the damage tracks, but they are generally small in size, on the order of µm, for example.

In another aspect, the glass has a plurality of damage tracks, wherein each of the damage tracks has a diameter of less than 5 µm, a spacing between adjacent damage tracks of at least 20 µm, and an aspect ratio of 20:1 or greater. The diameter of the damage tracks can be less than 1 µm.

In still another aspect, a glass article includes a stack of glass substrates with a plurality of damage tracks formed through the stack, wherein the damage tracks extend through each of the glass substrates, and wherein the damage tracks are between about 1 µm and about 100 µm in diameter and have a spacing of about 25 µm to about 1000 µm between adjacent damage tracks. In one aspect, the glass article can include at least two glass substrates separated by an air (or gas) gap larger than 10 µm. Further in this aspect, in this case the focal line length needs to be longer than the stack height. In another aspect, the stack of substrate may contain substrates of different glass compositions throughout the stack.

In another aspect, besides translating the glass article underneath the laser beam, it is possible to use other methods for rapidly moving the laser across the surface of the glass article to form a plurality of damage tracks such as, but not limited to, moving the optical head that delivers the laser beam, using galvanometers and f-theta lenses, acousto-optic deflectors, spatial light modulators, etc.

In some aspects, depending upon the desired pattern of damage tracks, the tracks can be created at a speed greater than about 50 damage tracks/s, greater than about 100 damage tracks/s, greater than about 500 damage tracks/s, greater than about 1,000 damage tracks/s, greater than about 2,000 damage tracks/s, greater than about 3,000 damage tracks/s, greater than about 4,000 damage tracks/s, greater than about 5,000 damage tracks/s, greater than about 6,000 damage tracks/s, greater than about 7,000 damage tracks/s, greater than about 8,000 damage tracks/s, greater than about 9,000 damage tracks/s, greater than about 10,000 damage tracks/s, greater than about 25,000 damage tracks/s, greater than about 50,000 damage tracks/s, greater than about 75,000 damage tracks/s, or greater than about 100,000 damage tracks/s.

In one aspect, the glass article is irradiated with a picosecond (ps) laser. In another aspect, the wavelength of irradiation is equal to or greater than 500 nm, or equal to or greater than 535 nm, or is from 500 nm to 1100 nm, or is 500 nm, 535 nm, 550 nm, 600 nm, 650 nm, 700 nm, 750 nm, 800 nm, 850 nm, 900 nm, 950 nm, 1000 nm, 1050 nm, or 1100 nm, where any value be a lower and upper endpoint of a range.

In a further aspect, a single laser burst is used to irradiate the glass article. In one aspect, this irradiation uses a power per burst of from 40 µJ to 120 µJ, or uses 40 µJ, 50 µJ, 60 µJ, 70 µJ, 80 µJ, 90 µJ, 100 µJ, 110 µJ, or 120 µJ, where any value be a lower and upper endpoint of a range. In another aspect, the single laser burst has burst number of about 20, or in the range from 10-30. In one aspect, the glass article can be irradiated with a wavelength of from 500 nm to 1100 nm at a power of from 40 µJ to 120 µJ. In one aspect, the glass article can be irradiated with a wavelength of from 500 nm to 550 nm at a power of from 40 µJ to 120 µJ.

Exemplary settings and parameters for producing damage tracks in the glass compositions described herein are provided in the Examples.

b. Etching

After formation of the damage track(s) in the glass article, the glass article is etched with an acid to produce the through glass via(s) from the damage tracks. Acid etching allows for the formation of through glass vias with dimensions that are practical for metallization or other chemical coating. Here, all the damage tracks are enlarged in parallel to a target diameter in a parallel process, which is much faster than using a repeated application of laser pulses to enlarge the damage tracks to form vias having a large diameter. In a further aspect, acid etching creates a stronger part compared to just using a laser to form TGVs, by avoiding formation of micro-cracks or other damage typically caused in the sidewalls of a TGV by a laser.

The product of the reaction of the acid with the glass article is referred to herein as the "etched byproduct". The etched byproduct can include soluble and/or insoluble compounds. As used herein, glass solubility refers to the solubility of the etched byproduct in an etchant. In one aspect, "the glass solubility in the etchant" is the amount of glass dissolved in 1 L of etchant.

In one aspect, the glass article with damage tracks is etched with hydrofluoric acid (HF). In another aspect, the HF is aqueous HF and the HF has a concentration of from 1 wt % to 50 wt %, or has a concentration of about 1 wt %, 5 wt %, 10 wt %, 15 wt %, 20 wt %, 25 wt %, 30 wt %, 35 wt %, 40 wt %, 45 wt %, or 50 wt % in water, where any value can be a lower and upper endpoint of a range (e.g., 5 wt % to 20 wt %). In another aspect, the etchant includes aqueous HF having a concentration of 1.0 M, 1.1 M, 1.2 M, 1.3 M, 1.4 M, 1.5 M, 1.6 M, 1.7 M, 1.8 M, 1.9 M, or 2 M, where any value can be a lower and upper endpoint of a range (e.g., 1.3 M to 1.5) and "M" refers to concentration in units of molarity (moles/liter).

In another aspect, the glass article is etched with HF in combination with one or more additional acids including, but not limited to, hydrochloric acid, sulfuric acid, nitric acid, acetic acid, or any combination or aqueous variations thereof. In another aspect, the etchant includes aqueous HF having a concentration of 1.0 M, 1.1 M, 1.2 M, 1.3 M, 1.4 M, 1.5 M, 1.6 M, 1.7 M, 1.8 M, 1.9 M, or 2 M, where any value can be a lower and upper endpoint of a range (e.g., 1.3 M to 1.5 M) in combination with $HNO_3$ having a concentration of 0.2 M, 0.4 M, 0.6 M, 0.8 M, 1.0 M, 1.2 M, 1.4 M, 1.6 M, 1.8 M, or 2.0 M, where any value can be a lower and upper endpoint of a range (e.g., 0.6 M to 1.0 M). In another aspect, the etchant includes aqueous HF having a concentration of about 1.45 M and $HNO_3$ having a concentration of about 0.8 M.

In a further aspect, the glass article can be etched at a temperature of from 0° C. to 50° C., or can be etched at 0° C., 5° C., 10° C., 15° C., 20° C., 25° C., 30° C., 35° C., 40° C., 45° C., or 50° C., where any value can be a lower and upper endpoint of a range (e.g., 10° C. to 30° C.). In another aspect, the glass article can be etched at room temperature.

In another aspect, the acid used is 10% HF/15% $HNO_3$ by volume. Further in another aspect, the glass article can be etched at about 25° C. for a time sufficient to remove about 100 µm of material from the thickness direction of the glass article. In a further aspect, the glass article is etched from 30 minutes to two hours, or from 40 minutes to 1.5 hours, or from 50 minutes to one hour.

In one aspect, the glass article to be etched can be added to a tank of acid and physically agitated. In a further aspect, the agitation can take the form of mechanical agitation, ultrasonic agitation, gas bubbling in the tank, or the like. In one aspect, the glass article can be immersed in an acid bath and ultrasonic agitation at a combination of 40 kHz and 80 kHz frequencies can be used to facilitate penetration of fluid (e.g. etchant) and fluid exchange in the damage tracks. In addition, manual agitation (e.g. mechanical agitation) of the glass article within the ultrasonic field can be performed to prevent standing wave patterns from the ultrasonic field from creating "hot spots" or cavitation-related damage on the glass article, and also to provide macroscopic fluid flow across the glass article.

The use of the glass compositions described herein and other process conditions makes it possible to minimize the accumulation of etched byproduct that collects in the through glass vias in the glass article. The accumulation of etched byproduct that collects in the through glass via reduces the waist diameter $D_w$ relative to the surface diameter $D_s$ of the through glass via, which is the smaller of $D_{S1}$ or $D_{S2}$ as shown in 3 at FIG. 1. As used herein, the waist diameter $D_w$ refers to the narrowest portion of a via located between top diameter $D_{S1}$ and bottom diameter $D_{S2}$. The accumulation of etched byproduct in the through glass via ultimately reduces the waist diameter $D_w$, which is undesirable.

Accumulation of etched byproduct occurs when the etched byproduct includes insoluble compounds (i.e., the portion of the etched byproduct that is insoluble in the etchant). The insoluble compounds become trapped in the TGV and act to reduce the waist diameter $D_w$ of the TGV. The etched byproduct typically includes salts of metals present in the glass composition and the counterion of the etchant (acid). When the etchant is HF, for example, fluoride salts of metals present in the glass composition form as etched byproducts. Fluoride salts produced as etched byproducts of common glass compositions include alkali metal fluorides. alkaline earth metal fluorides, aluminum fluoride, metal fluorosilicates, metal fluoroaluminates, and metal fluoroborates.

The present disclosure recognizes that the glass solubility in the etchant of the different possible fluoride compounds that can be present in the etched byproducts varies and that the proportion of insoluble fluoride compounds present in the etched byproduct can be controlled through selection of the glass composition. In particular, the proportion of insoluble compounds can be reduced by minimizing the concentration of constituents in the glass composition that form fluoride compounds having low solubility. Fluorides of alkaline earth metals and fluoroaluminate compounds, for example, are known to have low solubility in acid etchants. In one aspect, the glass composition herein includes a low concentration of alkaline earth metals (or alkaline earth metal oxides RO) and/or a low concentration of aluminum (or $Al_2O_3$). The preferred amounts of alkaline earth metal oxides and aluminum oxide are described in the glass compositions disclosed above. Fluorosilicate compounds, in contrast, have a relatively high solubility and in one aspect, the glass compositions disclosed herein have a high silica ($SiO_2$) concentration (e.g. greater than 50 mol %).

In some aspects, etched byproduct is produced by the processes and methods described herein. In some aspects, etched byproduct is soluble or slightly soluble in the etching solution and the etched byproduct does not precipitate in the etching solution until a certain concentration of etched byproduct is produced by the processes and methods described herein. In some aspects, the etched byproduct has an etched byproduct solubility greater than or equal to 0.5 g/L in the etching solution. In some aspects, the etched byproduct has an etched byproduct solubility of 0.5, 1, 1.5, 2, 2.5, 3, 3.5, 4, 4.5, or 5 g/L of etching solution, where any value can be a lower and upper end-point of a range (e.g., 1 to 5 g/L, 2 to 4 g/L).

In some aspects, the etching solution used to determine the solubility of the etched byproduct includes water, HF, and $HNO_3$. In some aspects, the etching solution used to determine the etched byproduct solubility is composed of water, HF at concentration of 0.1 M to 3 M, 0.5 M to 1.8 M, 1 M to 1.6 M, or 1.3 M to 1.5 M and $HNO_3$ at a concentration of 0.1 M to 3 M, 0.2 M to 1.5 M, 0.5 M to 1 M, or 0.6 M to 0.9 M. In some aspects, the etching solution used to determine the etched byproduct solubility is composed of water, HF at concentration of 0.1 M to 2 M, 0.5 M to 1.8 M, 1 M to 1.6 M, or 1.3 M to 1.5 M and $HNO_3$ at a concentration of 0.1 M to 2 M, 0.2 M to 1.5 M, 0.5 M to 1 M, or 0.6 M to 0.9 M, and the etched byproduct is determined at 20° C. In some aspects, the etching solution used to determine the etched byproduct solubility is composed of water, HF at concentration of 1.45 M, and $HNO_3$ at a concentration of 0.8 M, and the etched byproduct is determined at 20° C. Unless otherwise specified, etched byproduct solubility is determined for a particular process using the lowest temperature at which etching occurs during the process.

In one aspect, the etch rate of the glass article can affect the waist diameter of the through glass via. Referring to FIG. 1, the glass article includes a damage track (denoted by a dashed line and corresponding to the portion of the glass subjected to laser treatment) surrounded by undamaged glass (the portion of the glass not subjected to laser treatment). The damage track has an etch rate $E_1$ and the undamaged glass has an etch rate $E_2$ as shown in 2 in FIG. 1. Due to differences in the physical or chemical state of the damage track relative to the undamaged glass, the etch rates $E_1$ and $E_2$ differ (e.g., see 3 in FIG. 1). Typically, $E_1 > E_2$ because the damage track includes a high concentration of structural defects that enhance the reactivity of the etching solution (e.g. acid solution). If etching byproduct accumulates in the damage track, the etch rate $E_1$ is decreased. By varying the etch rate $E_1$ relative to the etch rate $E_2$, the waist diameter $D_w$ of the via can be modulated (i.e., increased or decreased).

In one aspect, the etch ratio $E_1:E_2$ can be used to modulate the waist diameter $D_w$ of the TGV. In one aspect, the etch ratio $E_1:E_2$ is from 1 to 50, or is about 10, 20, 30, 40, or 50, where any value can be a lower and upper endpoint of a range, e.g. 5 to 50, 10 to 40, or 15 to 30). In another aspect, the etch ratio $E_1:E_2$ is greater than 10, greater than 20, greater than 30, or greater than 40.

In another aspect, an etch rate $E_2$ of less than, for example, about 2 μm/min allows the etching solution (e.g. acid solution) to fully penetrate the damage tracks, especially when coupled with agitation to exchange fresh etching solution and remove dissolved material (e.g. soluble compounds of the etched byproduct) from the damage tracks, which are typically very narrow when initially formed by the laser. In this aspect, the damage tracks expand during etching at nearly the same rate throughout the thickness of the glass article (i.e. in the depth direction or throughout the length of the damage track). In some aspects, the etch rate $E_2$ can be a rate of less than about 10 μm/min, such as a rate of less than about 5 μm/min, or a rate of less than about 2 μm/min.

In one aspect, the etch rates $E_1$ and $E_2$ can be controlled by adjusting an acid concentration in the etching solution. In other aspects, the orientation of the glass article in the etching tank, mechanical agitation, and/or the addition of surfactant to the etching solution can be modified to adjust the etching rates $E_1$ and $E_2$ and the attributes of the TGVs formed by enlarging the damage tracks. In some aspects, the etching solution is ultrasonically agitated and the glass article is oriented in the etching tank and positioned in the etching solution so that the top and bottom openings of the damage tracks receive substantially uniform exposure to the ultrasonic waves to promote uniform etching of the damage tracks. For example, if the ultrasonic transducers are arranged at the bottom of the etching tank, the glass article can be oriented in the etching tank so that the surfaces of the glass article with the damage tracks are perpendicular to the bottom of the etching tank rather than parallel to the bottom of the etching tank. In some aspects, the etching tank can be mechanically agitated in the x, y, and z directions to improve the uniformity of the etching of the damage tracks. In some aspects, the mechanical agitation in the x, y, and z directions can be continuous.

Using the glass compositions and processing conditions described herein, TGVs can be produced in glass articles where the waist diameter $D_w$ approaches the surface diameter $D_s$, where $D_s$ corresponds to the lesser of $D_{S1}$ and $D_{S2}$ as depicted in FIG. 1. In one aspect, the ratio of $D_{S1}$ and $D_{S2}$ is 0.9:1, 0.95:1, 0.99:1, or 1:1. In another aspect, the ratio of the surface diameter ($D_s$) and the waist diameter ($D_w$) is from 1:1 to 2:1, or 1:1, 1.1:1, 1.2:1, 1.3:1, 1.4:1, 1.5:1, 1.6:1, 1.7:1, 1.8:1, 1.9:1, or 2:1, where any value can be a lower and upper endpoint of a range (e.g., 1.2:1 to 1.8:1).

In another aspect, the waist diameter $D_w$ is about 50% or greater, about 55% or greater, about 60% or greater, about 65% or greater, about 70% or greater, about 75% or greater, about 80% or greater, about 85% or greater, about 90% or greater, about 95% or greater, or about 100% of the surface diameter $D_s$ of the via, where $D_s$ corresponds to the lesser of $D_{S1}$ and $D_{S2}$. In another aspect, the waist diameter $D_w$ of the hole is 50% to 100%, 50% to 95%, 50% to 90%, 50% to 85%, 50% to 80%, 50% to 75%, 50% to 70%, 55% to 100%, 55% to 95%, 55% to 90%, 55% to 85%, 55% to 80%, 55% to 75%, 55% to 70%, 60% to 100%, 60% to 95%, 60% to 60%, 60% to 85%, 60% to 80%, 60% to 75%, 60% to 70%, 65% to 100%, 65% to 95%, 65% to 90%, 65% to 85%, 65% to 80%, 65% to 75%, 65% to 70%, 70% to 100%, 70% to 95%, 70% to 90%, 70% to 85%, 70% to 80%, 70% to 75%, 75% to 100%, 75% to 95%, 75% to 90%, 75% to 85%, 75% to 80%, 80% to 100%, 80% to 95%, 80% to 90%, 80% to 85%, 85% to 100%, 85% to 95%, 85% to 90%, 90% to 100%, 90% to 95%, or 95% to 100% of the surface diameter $D_s$ of the via, where any value can be a lower and upper endpoint of a range, and where $D_s$ corresponds to the lesser of $D_{S1}$ and $D_{S2}$.

In some aspects, a surfactant can be added to the etching solution to increase the wettability of the damage tracks. Without wishing to be bound by theory, the increased wettability provided by the surfactant lowers the diffusion time of the etching solution into a damage track and can allow for increasing the ratio of the waist diameter $D_w$ of the TGV relative to the surface diameter $D_s$ of the TGV. In some aspects, the surfactant can be any suitable surfactant that dissolves into the etching solution and that does not react with the acid(s) in the etching solution. In some embodiments, the surfactant is a fluorosurfactant such as Capstone® FS-50 or Capstone® FS-54. In some aspects, the concentration of the surfactant in terms of mL of surfactant/L of etching solution is about 1, about 1.1, about 1.2, about 1.3, about 1.4, about 1.5, about 1.6, about 1.7, about 1.8, about 1.9, about 2 or greater.

Each surface diameter $D_s$ (i.e., $D_{S1}$ and $D_{S2}$) of the through glass vias can vary depending upon processing conditions. In one aspect, each surface diameter $D_s$ of the TGV is from 10 µm to 100 µm. In another aspect, each surface diameter $D_s$ of the TGV is 10 µm, 15 µm, 20 µm, 25 µm, 30 µm, 35 µm, 40 µm, 45 µm, 50 µm, 55 µm, 60 µm, 65 µm, 70 µm, 75 µm, 80 µm, 85 µm, 90 µm, 95 µm, or 100 µm, where any value can be a lower and upper endpoint (e.g., 20 µm to 80 µm). In another aspect, each surface diameter $D_s$ of the TGV is from 10 µm to 100 µm. In another aspect, the waist diameter $D_w$ of the TGV is 5 µm, 10 µm, 15 µm, 20 µm, 25 µm, 30 µm, 35 µm, 40 µm, 45 µm, 50 µm, 55 µm, 60 µm, 65 µm, 70 µm, 75 µm, 80 µm, 85 µm, or 90 µm, where any value can be a lower and upper endpoint (e.g., 10 µm to 90 µm, or 20 µm to 80 µm, or 30 µm to 70 µm).

The glass article can have a plurality of through glass vias. In one aspect, the spacing (center to center distance) between adjacent vias is about 10 µm or greater, or about 20 µm or greater, or about 30 µm or greater, or about 40 µm or greater, or about 50 µm or greater, or in the range from 10 µm to 100 µm, or in the range from 20 µm to 90 µm.

In a still further aspect, the glass article is a single glass sheet composed of a glass composition disclosed herein. In one aspect, the glass sheet has a thickness of from 50 µm to 500 µm, or has a thickness of about 50, 100, 150, 200, 250, 300, 350, 400, 450, or 500 µm, where any value can be a lower and upper endpoint (e.g., 100 µm to 300 µm). In other aspects, the glass article can be composed of two or more glass sheets, where one or more of the sheets are composed of a glass composition disclosed herein having a thickness disclosed herein.

In one aspect, the through glass vias have an aspect ratio (ratio of length to diameter) of about 1:1 or greater, about 2:1 or greater, about 3:1 or greater, about 4:1 or greater, about 5:1 or greater, about 6:1 or greater, about 7:1 or greater, about 8:1 or greater, about 9:1 or greater, about 10:1 or greater, about 11:1 or greater, about 12:1 or greater, about 13:1 or greater, about 14:1 or greater, about 15:1 or greater, about 16:1 or greater, about 17:1 or greater, about 18:1 or greater, about 19:1 or greater, about 20:1 or greater, about 25:1 or greater, about 30:1 or greater, or about 35:1 or greater. In another aspect, the aspect ratio of the through glass vias can be in a range from about 5:1 to about 10:1, about 5:1 to 20:1, about 5:1 to 30:1, or about 10:1 to 20:1 about 10:1 to 30:1.

The acid etching of the glass article to enlarge the damage tracks to form TGVs with diameters $D_w$ and $D_s$ can have a number of benefits: 1) acid etching changes the TGVs from a size (for example, about 1 µm for the initial damage track) that is too small to practically metalize and use for interposers to more convenient size (for example, 5 µm or higher); 2) etching can take what may start as a non-contiguous damage track through the glass and etch it to form a continuous though glass via; 3) etching is a highly parallel process where all of the damage tracks in a part are enlarged simultaneously to form TGVs, which is much faster than what would happen if a laser had to re-visit damage tracks multiple times to continually remove more material to enlarge the damage tracks; and 4) etching helps blunt any edges or small checks within the glass article, especially in the sidewalls of the TGVs that would be produced by repeated or prolonged laser application, increasing the overall strength and reliability of the material.

III. Applications of Glass Articles with TGVs

In one aspect, once formed, the glass article with TGVs may then be coated and/or filled with a conductive material, for example through metallization, in order to create an interposer made of the glass article. As used herein, "metallization" refers to a technique of coating a metal or other conductive material on the surface of an object or filling a TGV with metal or conductive material. Metallization and subsequent conductivity through the TGVs is improved when the ratio of surface diameter:waist diameter ($D_s$:$D_w$) approaches 1 and the TGVs are more cylindrical in shape, leading to a uniform cross-sectional area of the metal or conductive material in the TGV.

In one aspect, the metal or conductive materials, for example copper, aluminum, gold, silver, lead, tin, indium tin oxide, or a combination or alloy thereof. In another aspect, the process used to metallize the interior of the TGVs is, for example, electro-plating, electroless plating, physical vapor deposition, chemical vapor deposition, or evaporative coating. In an alternative aspect, the TGVs may also be coated or lined with catalytic materials, such as platinum, palladium, titanium dioxide, or other materials that facilitate chemical reactions within the TGVs to promote metallization. In yet another aspect, the TGVs may be coated or lined with chemical functionalization, so as to change surface wetting properties or allow attachment of biomolecules and use for biochemical analysis. Further in this aspect, such chemical functionalization could be silanization of the glass surface of the TGVs, and/or additional attachment of specific proteins, antibodies, or other biologically specific molecules, designed to promote attachment of biomolecules to the surface of the TGVs for desired applications.

In another aspect, the glass composition can be modified in order to reduce the loss tangent. A low loss tangent means an element of a circuit (e.g. interposer) exhibits a low amount of dielectric absorption. In one aspect, by increasing the amount of $B_2O_3$ in the glass composition, the loss tangent of the glass is reduced. This aspect is discussed further in the Examples.

EXAMPLES

The following examples are put forth so as to provide those of ordinary skill in the art with a complete disclosure and description of how the compounds, compositions, and methods described and claimed herein are made and evaluated, and are intended to be purely exemplary and are not intended to limit the scope of the discovery disclosed herein. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric. Numerous variations and combinations of reaction conditions (e.g., component concentrations, desired solvents, solvent mixtures, temperatures, pressures, and other reaction ranges and conditions) can be used to optimize the product purity and yield obtained from the described process. Only reasonable and routine experimentation will be required to optimize such process conditions.

Example 1: Glass Compositions

Silicate glasses with $Al_2O_3$ and RO (combined amounts of BaO, CaO, MgO, SrO) evaluated herein are provided in Tables 1 and 2. Two glass samples not listed in Table 1 were also evaluated. Samples 4 and 5 were samples of Eagle XG® glass and IRIS™ glass, respectively (both available from Corning Incorporated, Corning NY).

TABLE 1

| Oxides | 1 mol % | 2 mol % | 3 mol % | 6 mol % | 7 mol % |
|---|---|---|---|---|---|
| $SiO_2$ | 67.5 | 57.84 | 63.6 | 70.41 | 71.89 |
| $Al_2O_3$ | 12.7 | 16.53 | 15.67 | 13.31 | 12.31 |
| $B_2O_3$ | 3.7 | | | 1.78 | 0.66 |
| $P_2O_5$ | | 6.45 | 2.48 | | |
| $Na_2O$ | 13.6 | 16.53 | 10.81 | | |
| $K_2O$ | | | | | |
| $Li_2O$ | | | 6.24 | | |
| MgO | 2.4 | 2.61 | | 4.07 | 4.97 |
| CaO | | | | 5.34 | 5.29 |
| ZnO | | | 1.16 | | |
| BaO | | | | 3.78 | 3.34 |
| $ZrO_2$ | | | | | |
| $TiO_2$ | | | | | |
| $Sb_2O_3$ | | | | | |
| $As_2O_3$ | | | | | |
| $SnO_2$ | 0.09 | 0.05 | 0.04 | 0.09 | 0.09 |
| SrO | | | | 1.22 | 1.45 |
| $Fe_2O_3$ | | | | | |
| $HfO_2$ | | | | | |
| Total | 99.99 | 100.01 | 100.00 | 100.00 | 100.00 |

TABLE 2

| Oxides | 8 mol % | 9 mol % | 10 mol % | 11 mol % | 12 mol % |
|---|---|---|---|---|---|
| $SiO_2$ | 70.54 | 64.64 | 67.51 | 45.00 | 65.00 |
| $Al_2O_3$ | 8.03 | 7.38 | 6.48 | 15.00 | 15.00 |
| $B_2O_3$ | 9.17 | 16.45 | 19.67 | 25.00 | 5.00 |
| $P_2O_5$ | 2.45 | | | | |
| $Na_2O$ | 6.29 | | | | |
| $K_2O$ | | | | | |
| $Li_2O$ | 3.42 | | | | |
| MgO | | 2.21 | 0.53 | | |
| CaO | | 8.14 | 5.27 | 15.00 | 15.00 |
| ZnO | | | | | |
| BaO | | | | | |
| $ZrO_2$ | | | | | |
| $TiO_2$ | | | | | |
| $Sb_2O_3$ | | | | | |
| $As_2O_3$ | | | | | |
| $SnO_2$ | 0.10 | 0.07 | 0.05 | | |
| SrO | | 1.11 | 0.50 | | |
| $Fe_2O_3$ | | | | | |
| $HfO_2$ | | | | | |
| Total | 100.00 | 100.00 | 100.00 | 100.00 | 100.00 |

Example 2: Laser Damage Test

Prior to etching, the silicate glasses in Tables 1 and 2 were subjected to a laser treatment process to form damage tracks. Parameters for the laser treatment are provided in Table 3. Different burst energies resulted in different TGV $D_w$ values (see Examples 3 and 4 below). The glass samples were laser processed to form damage tracks using a system equipped with a Coherent Hyper-Rapid-50 picosecond laser operating at wavelength of 532 nm. The beam delivery optics were configured to create a Gauss-Bessel laser beam focal line, with an optical intensity distribution along the beam propagation axis of 0.74 mm full-width half maximum, and a spot size of 1.2 μm in diameter, as measured by the diameter of the first nulls or intensity minimums in the cross-sectional profile of the Gauss-Bessel laser beam. Each damage track was formed by exposing the substrate to a single laser burst that contained 20 laser pulses (burst number=20), where each burst had a duration of 7.2 ps and the time interval between the pulses inside each burst was 20 ns. Laser bursts with various burst energies, ranging from 16 μJ to 108 μJ, were used for each experiment. The burst energies used in the test are shown in Table 3. The spacing between each damage track was 150 μm.

TABLE 3

Laser Burst Energy for Laser Damage Test
Burst Energy (µJ)*

| |
|---|
| 16 |
| 23 |
| 32 |
| 40 |
| 49 |
| 58 |
| 68 |
| 79 |
| 89 |
| 102 |
| 108 |

*Burst number 20.

Example 3: Glass Etch Properties

Following the laser treatment, the glass samples were etched as follows. A 400 µm thick specimen of each glass sample was statically etched at room temperature in 1.45M HF and 0.8M HNO$_3$ until the thickness was reduced to 300 µm using the procedure in Example 5. The procedure in Example 5 was also used to measure the glass solubility. Etch time was recorded. Final top diameters (D$_1$) were close to 80 µm in most cases. The waist diameter and final thickness were measured using an optical microscope.

The sludge/glass conversion ratio was calculated using the following procedure, where the term "sludge" is used to refer to the insoluble portion of the etched byproduct. The sludge concentration (gram/L of etchant) was measured at different input glass concentrations (gram/L). The sludge/glass conversion ratio was determined by adding glass to the etchant in an amount corresponding to the solubility limit to form a saturated solution of the glass in the etchant. An additional mass of glass was then added to the saturated etchant and the mass of sludge formed was determined. The sludge/glass conversion ratio is the ratio of the mass of sludge formed to the mass of additional glass added under these conditions. For example, if 1 gram/L of sludge is generated after 4 gram/L of glass is added to a saturated etchant, the sludge/glass conversion ratio is 0.25. At least two to three data points that varied in sludge concentration and input glass concentration were obtained. The sludge concentration (Y axis) was plotted against input glass concentration (X-axis). The slope of the plot is the sludge/glass conversion ratio, where the intercept at the x-axis, is the glass solubility in the etchant.

TABLE 4

Glass Etch Properties and Corresponding Glass Composition Information

| Glass Code | E$_2$ (Bulk Etch Rate in µm/min) | Glass solubility (g/L) | Sludge/Glass Conversion Ratio (g/g) | Waist Diameter (µm) | E$_1$/E$_2$ (Etch Ratio) | Al$_2$O$_3$ (mol %) | Total RO (mol %) |
|---|---|---|---|---|---|---|---|
| 1 | 0.92 | 3.7 | 0.53 | 11.8 | 4.554 | 12.7 | 17.3 |
| 2 | 2.54 | 2.2 | 0.53 | 10.6 | 4.185 | 16.53 | 20.7 |
| 3 | 1.49 | 4.5 | 0.47 | 6.4 | 4.268 | 15.67 | 19.9 |
| 4 | 0.34 | 3.7 | 0.42 | 30.8 | 6.294 | 11.02 | 17.3 |
| 5 | 0.191 | 2.9 | 0.32 | 45 | 8.586 | 5.18 | 13.8 |
| 6 | 0.32 | 2.0 | 0.44 | 29.1 | 5.688 | 13.31 | 19.0 |
| 7 | 0.28 | 3.4 | 0.56 | 31.4 | 5.893 | 12.31 | 18.2 |
| 8 | 0.44 | 13.0 | n/a | 48.2 | 7.795 | 8.03 | 15.8 |
| 9 | | 0.0 | 0.22 | | | 7.38 | 7.4 |
| 10 | 0.68 | 1.8 | 0.16 | 21.3 | 5.132 | 6.48 | 11.6 |

Example 4: D$_w$ Comparison for Different Glass Compositions at Different Laser Damage Conditions Glass compositions 4 and 8 were subjected to laser treatment using bursts of different energy and etched as described in Examples 2 and 5. D$_w$ values were determined for the two glass compositions after laser treatment with burst energies of 68 µJ and 79 µJ and etching (FIGS. 2A-2E). The etched glass solubilities for glass compositions 4 and 8 were 3.4 g/L and >13 g/L, respectively, as determined using the procedure in Example 5. Each glass sample had 400 µm thickness before etching. The etching process removed about 100 µm of thickness from the samples. Final top diameters D$_{S1}$ for the TGVs were about 80 µm in both glass compositions. Glass composition 8 (squares in FIG. 2A) exhibited consistently higher D$_w$ values across a range of laser damage conditions compared to glass composition 4 (diamonds in FIG. 2A). Side profiles of glass composition 4 damaged with laser bursts with energies 68 µJ and 79 µJ, respectively, can be seen in FIGS. 2B and 2C, while side profiles of glass composition 8 damaged with laser bursts of 68 µJ and 79 µJ, respectively, can be seen in FIGS. 2D and 2E. In FIGS. 2B-2E, the bright regions correspond to undamaged glass and the vias correspond to the dark regions between the bright regions. In the perspective of FIGS. 2B-2E, the glass samples are oriented such that the thickness of the glass samples corresponds to the horizontal length of the bright spots. The approximately hour glass shape of the TGVs is evident and the top diameter D$_{S1}$ (left side of TGV) and bottom diameter D$_{S2}$ (right side of TGV) of the TGVs are approximately equal.

Example 5: Determination of Glass Solubility in Etchant

The glass solubility in an etchant (1.45M HF and 0.8M HNO$_3$) was evaluated. The etchant influences the etch rate ratio E$_1$/E$_2$ for etching damage tracks to form TGVs. When the etch rate E$_2$ is relatively low, etchant can diffuse deep into the damage tracks to more uniformly expand the damage tracks (or TGVs formed therefrom) in the radial direction (i.e. direction normal to the depth direction of the TGV) along the depth of the TGV. When the etch rate E$_2$ is higher, a proportionately greater fraction of the etchant is consumed at the entry of the TGV (in the vicinity of top diameter D$_{S1}$ and/or bottom diameter D$_{S2}$) and less penetration of the etchant in the depth direction of the TGV occurs, leading to a smaller D$_w$ relative to the surface diameter D$_s$.

Solubility studies were performed for various glass compositions in order to determine which were most likely to exhibit TGV formation with desired D$_w$ values and/or higher D$_w$/D$_s$ ratios. Glass solubility in a particular etchant (e.g. in 1.45M HF and 0.8M HNO$_3$) is defined as below: the maximum amount of glass added to 1 liter of the etchant at a defined temperature room temperature, approximately 20° C.) without showing solid precipitate (solid precipitate is less than 0.1 g/L). The unit of the glass solubility used herein is gram of glass per liter of etchant, or g/L.

The following procedure was used to measure the glass solubility in etchant.

Glass powder (100 mesh)/etchant mixtures at concentrations of 4 g/L, 7 g/L, 10 g/L, and (if needed) 13 g/L were prepared. Additional HF was added to compensate for the loss of HF during glass dissolution. In general, 0.8 mol-1 mol of additional HF is added to dissolve every 10 gram of glass powder. For example, 1 mol of additional HF was added to the 10 g/L glass and etchant mixture to compensate for the consumption of HF occurring during glass dissolution.

The mixture was stirred 5 days to ensure complete reaction between glass powder and etchant. The precipitate (i.e., insoluble etched byproduct) was stratified to the bottom of the container by settling for 1 day. The insoluble etched byproduct was separated by centrifuged, dried in air, and the weight measured. A plot of glass/etchant concentration (X axis) and weight of insoluble etched byproduct (Y axis) was prepared. The intercept at the X-axis is the maximum amount of glass (g/L) that can add to the etchant without showing a precipitate. This value is the reported glass solubility in etchant. Solubility study results and additional experimental parameters are provided in Table 4 and Table 5 for the different glass samples, respectively.

TABLE 5

Glass Solubility Study

| Glass Sample | HF Consumption Rate (mol HF/100 g of glass) | Sample Mass (g) | HF (mL) | $H_2O$ (mL) | $HNO_3$ (mL) | Sludge (g/L) |
| --- | --- | --- | --- | --- | --- | --- |
| 1 | 9.02 | 1 | 8.1 | 86.9 | 5.0 | 3.5 |
| 2 | 7.64 | 1 | 7.6 | 87.4 | 5.0 | 4.1 |
| 3 | 8.46 | 1 | 7.9 | 87.1 | 5.0 | 2.84 |
| 4 | 9.83 | 1 | 8.4 | 86.6 | 5.0 | 2.4 |
| 5 | 8.71 | 1 | 8.0 | 87.0 | 5.0 | 2.19 |
| 6 | 9.07 | 1 | 8.1 | 86.9 | 5.0 | 3.81 |
| 7 | 9.05 | 1 | 8.1 | 86.9 | 5.0 | 3.67 |
| 8 | 9.06 | 1 | 8.1 | 86.9 | 5.0 | 0 |
| 9 | 9.78 | 1 | 8.4 | 86.6 | 5.0 | 2.3 |
| 10 | 10.11 | 1 | 8.5 | 86.5 | 5.0 | 1.19 |
| 1 | 9.02 | 0.7 | 7.2 | 87.8 | 5.0 | 1.62 |
| 2 | 7.64 | 0.7 | 6.8 | 88.2 | 5.0 | 2.57 |
| 3 | 8.46 | 0.7 | 7.0 | 88.0 | 5.0 | 1.08 |
| 4 | 9.83 | 0.7 | 7.4 | 87.6 | 5.0 | 1.5 |
| 5 | 8.71 | 0.7 | 7.1 | 87.9 | 5.0 | 1.35 |
| 6 | 9.07 | 0.7 | 7.2 | 87.8 | 5.0 | 2.1 |
| 7 | 9.05 | 0.7 | 7.2 | 87.8 | 5.0 | 2.05 |
| 8 | 9.06 | 0.7 | 7.2 | 87.8 | 5.0 | 0 |
| 9 | 9.78 | 0.7 | 7.4 | 87.6 | 5.0 | 1.55 |
| 10 | 10.11 | 0.7 | 7.4 | 87.6 | 5.0 | 0.84 |
| 1 | 9.02 | 1.3 | 9.0 | 86.0 | 5.0 | 4.79 |
| 2 | 7.64 | 1.3 | 8.4 | 86.6 | 5.0 | 5.75 |
| 3 | 8.46 | 1.3 | 8.8 | 86.2 | 5.0 | 3.91 |
| 4 | 9.83 | 1.3 | 9.4 | 85.6 | 5.0 | 4.01 |
| 5 | 8.71 | 1.3 | 8.9 | 86.1 | 5.0 | 3.25 |
| 6 | 9.07 | 1.3 | 9.1 | 85.9 | 5.0 | 4.76 |
| 7 | 9.05 | 1.3 | 9.1 | 85.9 | 5.0 | 5.43 |
| 8 | 9.06 | 1.3 | 9.1 | 85.9 | 5.0 | 0 |
| 9 | 9.78 | 1.3 | 9.4 | 85.6 | 5.0 | 2.88 |
| 10 | 10.11 | 1.3 | 9.5 | 85.5 | 5.0 | 1.77 |

FIGS. 3A and 3B shows side profiles of TGVs (oriented vertically) formed at different etch rates, where the etch rate is determined by measuring the change in glass thickness before and after the etching. FIG. 3A (glass composition 4 in Table 1) shows a side profile of a through glass via when the etch rate $E_2$ is lower than 0.9 μm/min. When the etch rate $E_2$ is relatively low, etchant can diffuse deep into the via and enlarge the waist diameter $D_w$ of the TGV (or damage track) as described above. FIG. 3B (glass composition 2 in Table 1) shows a side profile of a through glass via when the etch rate $E_2$ is higher than 0.9 μm/min. When the etch rate $E_2$ is high, etchant is significantly consumed in the portions of the TGV (or damage track) adjacent to the points of entry of the etchant into the TGV. Efficient etching in the radial direction near the top and bottom surfaces consumes the etching solution and inhibits penetration of the etching solution in the depth (length) direction of the via. As a result, the waist diameter $D_w$ of the via is reduced relative to the surface diameter $D_s$. This effect is evident when comparing the waist diameter $D_w$ for the glass in FIG. 3B to waist diameter $D_w$ for the glass in FIG. 3A.

FIG. 3C is a graph of the correlation between glass solubility in an etchant (1.45 M HF with 0.8 M $HNO_3$) and etch ratio. Etch ratio can be significantly improved by reducing the etch rate $E_2$ (comparing the plots of the square ($E_2$<0.25 μm/min), diamond (0.25 μm/min<$E_2$<0.9 μm/min), and triangle ($E_2$>0.9 μm/min) symbols). When the etch rate $E_2$ is too high (triangles), glass solubility change does not significantly influence etch ratio. When the etch rate $E_2$ is between 0.25 μm/min and 0.29 μm/min, an increase in the glass solubility increases the etch ratio.

Figure 4:
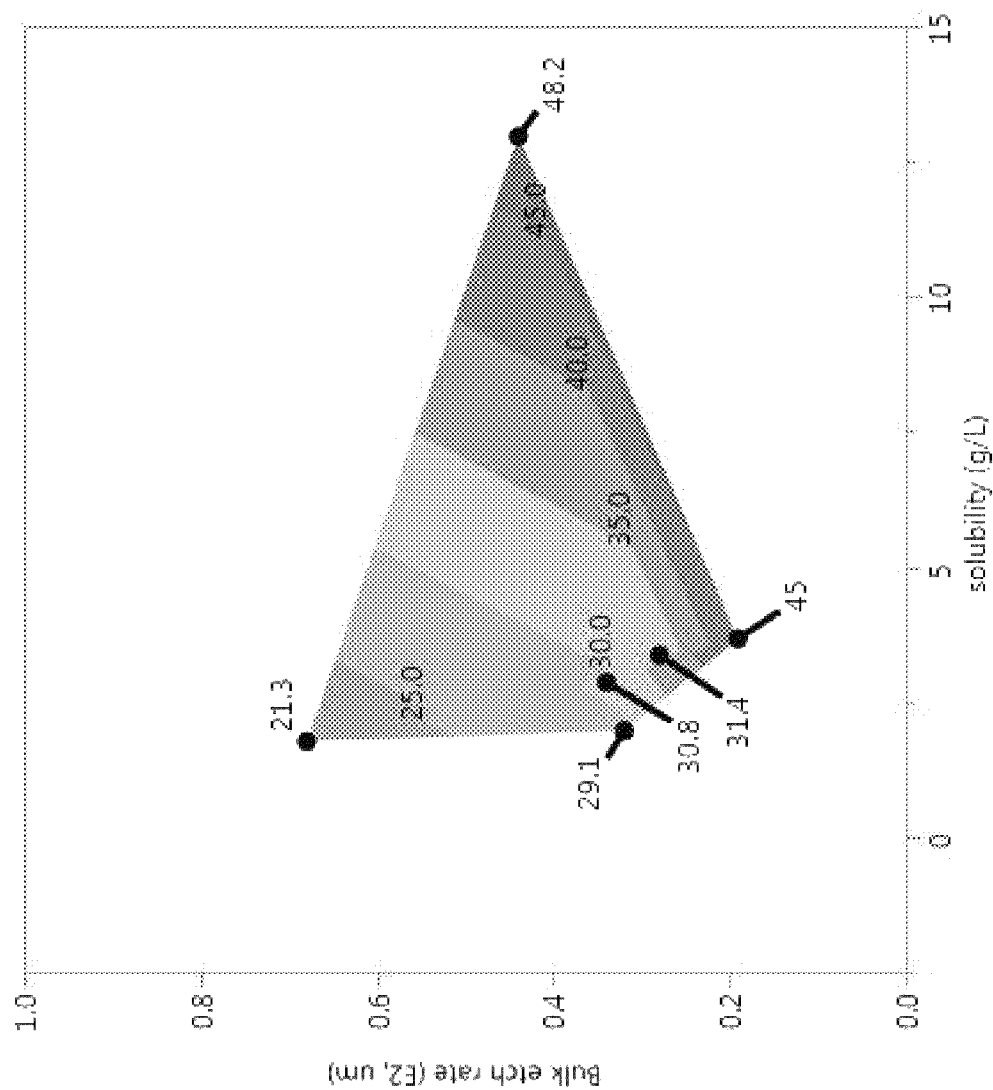
FIG. 4 shows a contour plot of via waist diameter ($D_w$) when the top via diameter ($D_1$) is about 90 µm and the final glass thickness is about 300 µm.

As further seen in FIG. 4, a contour plot of $D_w$ as it relates to the etch rate $E_2$ and glass solubility in etchant for a TGV with a surface diameter $D_s$=90 μm and a glass sheet sample with thickness 300 μm, waist diameter $D_w$ can be more effectively increased by either lowering the etch rate $E_2$ or increasing the glass solubility in the etchant (1.45M HF and 0.8M $HNO_3$). Contours are presented using contour lines labeled with numbers 25.0, 30.0, 35.0, 40.0, and 45.0 corresponding to waist diameter $D_w$ in units of μm. Black dots represent measured values.

Example 6: Effects of Glass Composition on Glass Solubility in Etchant

Figure 5:
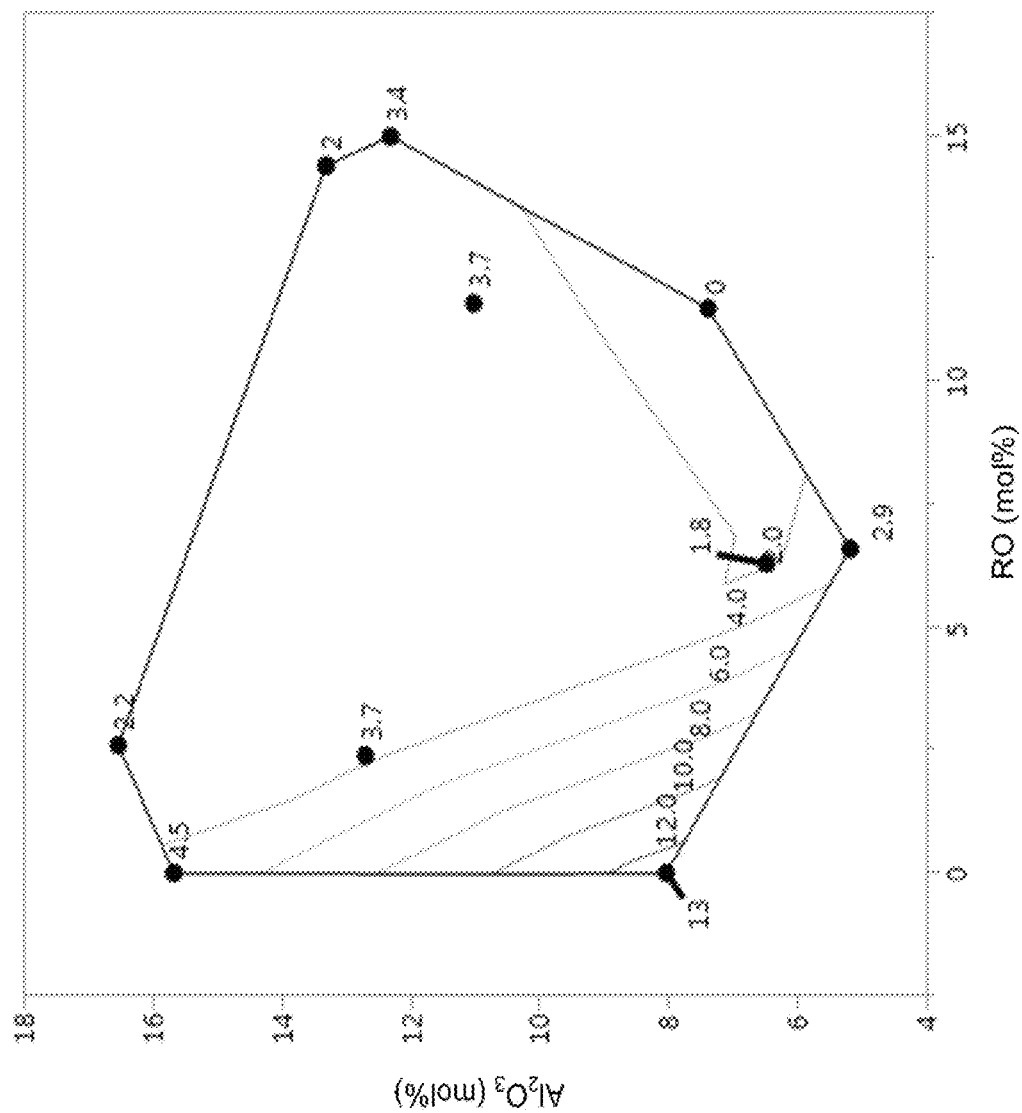
FIG. 5 shows that glass byproduct solubility in an etchant can be increased by reducing the mole percentages of aluminum oxide and total alkaline earth metal in the glass composition.

Glass composition can also affect glass solubility in etchant. FIG. 5 shows the effects of $Al_2O_3$ mole percent (left axis) and alkaline earth metal oxide (RO) mole percent (bottom axis) on glass solubility in 1.45M HF and 0.8M $HNO_3$ at room temperature, with the far-left contour (with contour label 12) representing optimum glass solubility in the etchant. Black dots represent measured values of glass solubility in etchant of 1.45 M HF and 0.8 M $HNO_3$ in units of g/L. Contour labels also correspond to glass solubility in the same etchant in units of g/L. Compositions with reduced mole percentages of $Al_2O_3$ and RO displayed the highest glass solubilities in the etchant.

Figure 6:
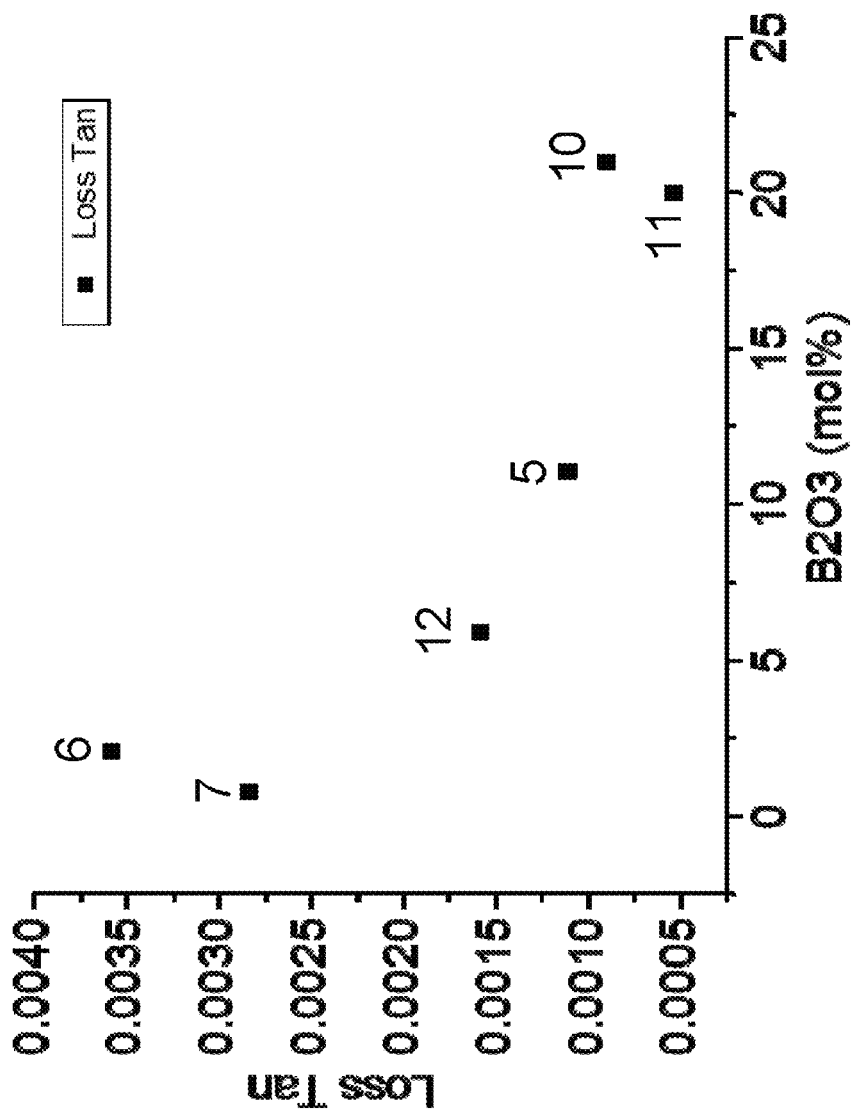
FIG. 6 shows the correlation of electronic properties (loss tangent) versus $B_2O_3$ concentration for alkali metal-free borosilicate glasses.

Example 7: Correlation of Electronic Properties with $B_2O_3$ Concentration for Alkali Metal-Free Borosilicate Glasses Glass compositions with reduced mole percentages of $Al_2O_3$ and RO provide TGVs with the preferred large ratio $D_w$:$D_s$. However, reducing or eliminating RO may adversely affect the electronic properties of a glass composition. Loss tangent, for example, is adversely affected when alkaline earth metal oxides are removed from a glass composition. In the course of the present disclosure, it was discovered that the loss tangent of alkali metal free glass compositions can be reduced by increasing the borate ($B_2O_3$) concentration. FIG. 6 shows a plot of loss tangent versus $B_2O_3$ mol %. In general, low loss tangent performance can be achieved by increasing borate concentration. In one aspect, the borate concentration is higher than 5 mol %, or higher than 10 mol %.

Throughout this publication, various publications are referenced. The disclosures of these publications in their entireties are hereby incorporated by reference into this application in order to more fully describe the methods, compositions, and compounds herein.

Various modifications and variations can be made to the materials, methods, and articles described herein. Other aspects of the materials, methods, and articles described herein will be apparent from consideration of the specification and practice of the materials, methods, and articles disclosed herein. It is intended that the specification and examples be considered as exemplary.

What is claimed:

1. A silicate glass article comprising one or more of through glass vias, wherein
   (a) the through glass via has a first surface diameter ($D_{S1}$), a second surface diameter ($D_{S2}$), and a waist diameter ($D_w$), wherein the ratio of $D_{S1}/D_w$ is from 1:1 to 2:1 and the ratio of $D_{S2}/D_w$ is from 1:1 to 2:1, and
   (b) the silicate glass comprises:
      (1) $B_2O_3$ in an amount of at least 5 mol %;
      (2) the presence of $Al_2O_3$ and RO, wherein $Al_2O_3$ is in an amount of less than 10 mol % and RO in a total amount of less than 10 mol %, wherein R is Mg, Ca, Ba, Sr, or any combination thereof, and
      (3) $P_2O_5$ in an amount of 1 mol % to 10 mol %,
      wherein the silicate glass is alkali free and does not include $TiO_2$.

2. The article of claim 1, wherein the amount of $B_2O_3$ in the silicate glass is from 5 mol % to 30 mol %.

3. The article of claim 2, wherein the amount of $B_2O_3$ in the silicate glass is from 5 mol % to 20 mol %.

4. The article of claim 1, wherein
the amount of $Al_2O_3$ in the silicate glass is from 1 mol % to 5 mol %.

5. The article of claim 1, wherein
the total amount of RO in the silicate glass is from 1 mol % to 5 mol %.

6. The article of claim 1, wherein
the amount of $Al_2O_3$ in the silicate glass is from 1 mol % to 5 mol % and
the total amount of RO in the silicate glass is from 1 mol % to 5 mol %.

7. The article of claim 1, wherein the silicate glass comprises the $B_2O_3$ in the amount an amount of at least 5 mol %, and
wherein the silicate glass further comprises:
   $SiO_2$ in an amount of 50 mol % to 75 mol %,
   $Al_2O_3$ in an amount of 4 mol % to less than 10 mol %,
   MgO in an amount of 0 mol % to less than 10 mol %,
   CaO in an amount of 0 mol % to less than 10 mol %,
   SrO in an amount of 0 mol % to less than 10 mol %,
   BaO in an amount of 0 mol % to less than 10 mol %, and
   $P_2O_5$ in an amount of 1 mol % to 10 mol %.

8. The article of claim 1, wherein the first surface diameter ($D_{S1}$) is from 10 μm to 100 μm and the second surface diameter ($D_{S2}$) is from 10 μm to 100 μm.

9. The article of claim 1, wherein the article has a thickness from 50 μm to 500 μm.

10. A method for producing the silicate glass article of claim 1, the method comprising:
   (1) irradiating the silicate glass article with a non-diffracting laser beam to form a laser beam focal line, induced absorption occurring within the laser beam focal line to produce a damage track, wherein the glass article comprises:
      (a) $B_2O_3$ in an amount of at least 5 mol %; and
      (b) the presence of $Al_2O_3$ and RO, wherein $Al_2O_3$ is in an amount of less than 10 mol % and RO in a total amount of less than 10 mol %, wherein R is Mg, Ca, Ba, Sr, or any combination thereof, and
      (c) $P_2O_5$ in an amount of 1 mol % to 10 mol %,
      wherein the silicate glass is alkali free and does not include $TiO_2$, and
   (2) etching the irradiated silicate glass article with an etching solution to produce the through glass via, the etching solution comprising an acid.

11. The method of claim 10, wherein the non-diffracting laser beam is formed with a picosecond laser.

12. The method of claim 10, wherein the non-diffracting laser beam has a wavelength of greater than 500 nm.

13. The method of claim 10, wherein the non-diffracting laser beam has a wavelength greater than 500 nm to 1,100 nm and a power from 40 μJ to 120 μJ.

14. The method of claim 10, wherein the etching solution comprises hydrofluoric acid and water, wherein the hydrofluoric acid has a concentration of from 1 wt % to 50 wt %.

15. The method of claim 10, wherein the etching solution comprises hydrofluoric acid in combination with hydrochloric acid, sulfuric acid, nitric acid, acetic acid, or any combination thereof.

16. The method of claim 10, wherein the non-diffracting laser beam is a Bessel beam or a Gauss-Bessel beam.

17. The method of claim 10, wherein the etching produces an etched byproduct, wherein the etched byproduct has an etched byproduct solubility greater than or equal to 0.5 g/L in the etching solution.

18. The method of claim 17, wherein the etching solution comprises water, HF at a concentration of 0.1 M to 3.0 M, and $HNO_3$ at a concentration of 0.1 M to 3.0 M.

19. A silicate glass article produced by the method of claim 10.

* * * * *